(12) United States Patent  (10) Patent No.: US 8,976,707 B2
Aramata et al.  (45) Date of Patent: Mar. 10, 2015

(54) RADIO-FREQUENCY FRONT-END MODULE

(75) Inventors: Tomohide Aramata, Nagaokakyo (JP);
Hidemori Akagi, Nagaokakyo (JP)

(73) Assignee: Murata Manufacturing Co., Ltd.,
Kyoto (JP)

( * ) Notice: Subject to any disclaimer, the term of this patent is extended or adjusted under 35 U.S.C. 154(b) by 94 days.

(21) Appl. No.: 13/584,961

(22) Filed: Aug. 14, 2012

(65) Prior Publication Data
US 2013/0051287 A1  Feb. 28, 2013

(30) Foreign Application Priority Data
Aug. 22, 2011 (JP) ................................. 2011-180074

(51) Int. Cl.
*H04L 12/28* (2006.01)
*H04L 5/14* (2006.01)

(52) U.S. Cl.
CPC . *H04L 5/14* (2013.01); *H04B 1/525* (2013.01)
USPC ........................................................ 370/254

(58) Field of Classification Search
CPC ........ H04B 1/1036; H04B 1/44; H04B 15/00;
H04B 1/0475; H04B 1/10; H04B 1/006;
H04B 1/525; H04B 1/0057; H04B 1/123;
H04B 1/0053; H04B 1/1081; H04B 1/38;
H04B 1/48
USPC ........ 370/278, 310, 338; 455/73, 83, 84, 101;
342/88; 375/316
See application file for complete search history.

(56) References Cited

U.S. PATENT DOCUMENTS

| 2005/0117664 A1* | 6/2005 | Adan et al. ..................... 375/316 |
| 2005/0143023 A1* | 6/2005 | Shih .............................. 455/101 |
| 2009/0180403 A1* | 7/2009 | Tudosoiu ....................... 370/278 |

FOREIGN PATENT DOCUMENTS

| JP | 2005-260784 A |   | 9/2005 |
| JP | 2005-269305 A |   | 9/2005 |
| JP | 2005-318293 A |   | 11/2005 |
| JP | 2010-45563 A |   | 2/2010 |
| JP | 2010045563 A | * | 2/2010 |

* cited by examiner

*Primary Examiner* — Jung-Jen Liu
(74) *Attorney, Agent, or Firm* — Keating & Bennett, LLP

(57) ABSTRACT

An RF front-end module includes power amplifiers, transmission-side filters, a reception-side filter, and a switch IC. A first transmission signal is output from a first transmission signal input terminal to a first common terminal via the power amplifier and the transmission-side filter. A second transmission signal is output from a second transmission signal input terminal to a second common terminal via the power amplifier and the transmission-side filter. A first reception signal input from the first common terminal and a second reception signal input from the second common terminal are input via the switch IC to the reception-side filter, common to the first and second reception signals, and are output from the reception-side filter to a reception signal output terminal.

7 Claims, 5 Drawing Sheets

US 8,976,707 B2

RADIO-FREQUENCY FRONT-END MODULE

BACKGROUND OF THE INVENTION

1. Field of the Invention

The present invention relates to a radio-frequency (RF) front-end module that transmits and receives, with a common antenna, a plurality of communication signals in different communication frequency bands.

2. Description of the Related Art

Various conventional RF front-end modules that transmit and receive a plurality of communication signals in different communication frequency bands have been put to practical use. Among these modules, there are RF front-end modules that transmit and receive communication signals with a common antenna for the communication signals.

When such a common antenna is used, generally transmitting and receiving circuits for the individual types of communication signals are switched and connected to the common antenna. Further, as illustrated in Japanese Unexamined Patent Application Publication No. 2010-045563, the transmitting circuit and the receiving circuit for each type of communication signal are connected to a switch element via a duplexer including a filter that passes a transmission frequency and a filter that passes a reception frequency.

In the Wideband Code Division Multiple Access (W-CDMA) communication system defined at present, the reception frequency band of communication signals in Band 1 ranges from about 2110 MHz to about 2170 MHz, and the reception frequency band of communication signals in Band 4 ranges from about 2110 MHz to about 2155 MHz. Therefore, the reception frequency band of communication signals in Band 1 and the reception frequency band of communication signals in Band 4 partially overlap.

In such a case, an RF front-end module such as that illustrated in FIG. 1 has been used. FIG. 1 is a circuit diagram of an RF front-end module 10P of the related art. The RF front-end module 10P includes power amplifiers 11 and 12, duplexers 21 and 22, and a switch integrated circuit (IC) 30P.

A transmission signal of a first communication signal (first transmission signal) input from a first transmission signal input terminal Ptx1 is output to a first common terminal Pc1 via the power amplifier 11 and a transmission-side filter 211 of the duplexer 21.

A transmission signal of a second communication signal (second transmission signal) input from a second transmission signal input terminal Ptx2 is output to a second common terminal Pc2 via the power amplifier 12 and a transmission-side filter 221 of the duplexer 22. The first transmission signal output from the first common terminal Pc1 and the second transmission signal output from the second common terminal Pc2 are transmitted from a common antenna (not illustrated) to the outside via a switch element (not illustrated).

A reception signal of the first communication signal (first reception signal) input via the common antenna and the switch element (both are not illustrated) to the first common terminal Pc1 is output to the switch IC 30P via a reception-side filter 212 of the duplexer 21.

A reception signal of the second communication signal (second reception signal) input via the common antenna and the switch element (both are not illustrated) to the second common terminal Pc2 is output to the switch IC 30P via a reception-side filter 222 of the duplexer 22.

The switch IC 30P outputs the first reception signal to a reception signal output terminal Prx12 at the time of reception control of the first reception signal, and outputs the second reception signal to the reception signal output terminal Prx12 at the time of reception control of the second reception signal.

The RF front-end module 10P such as that illustrated in FIG. 1 has large circuit dimensions since the RF front-end module 10P has a duplexer for each type of communication signal. In order to comply with the specification of a reception signal modulator circuit and the like, which is provided for reception signals subsequent to the RF front-end module 10P, reception signals are normally output as balanced signals, and the switch IC 30P of the related art is a double-pole four-through (DP4T) switch. This point also increases the circuit dimensions. Therefore, it is difficult to miniaturize the RF front-end module 10P of the related art.

SUMMARY OF THE INVENTION

Accordingly, preferred embodiments of the present invention provide an RF front-end module whose circuit dimensions are small while having functions equivalent to those of an RF front-end module of the related art.

According to a preferred embodiment of the present invention, there is provided a radio-frequency (RF) front-end module that transmits and receives a first communication signal including a first transmission signal and a first reception signal, and a second communication signal including a second transmission signal and a second reception signal. The RF front-end module includes a first transmission signal input terminal to which the first transmission signal is input; and a first common terminal that outputs the first transmission signal and inputs the first reception signal. The RF front-end module includes a second transmission signal input terminal to which the second transmission signal is input; and a second common terminal that outputs the second transmission signal and inputs the second reception signal. The RF front-end module includes a reception signal output terminal that outputs the first reception signal and the second reception signal. The RF front-end module includes a first transmission-side filter connected between the first transmission signal input terminal and the first common terminal, the first transmission-side filter having a pass band that is a frequency band of the first transmission signal and an attenuation band including a frequency band of the first reception signal; and a second transmission-side filter connected between the second transmission signal input terminal and the second common terminal, the second transmission-side filter having a pass band that is a frequency band of the second transmission signal and an attenuation band including a frequency band of the second reception signal. The RF front-end module includes a switch element including a plurality of individual ports to which the first common terminal and the second common terminal are respectively connected, and a common port to which the plurality of individual ports are individually switched and connected; and a reception-side filter connected between the common port and the reception signal output terminal, the reception-side filter having a pass band including the frequency bands of the first reception signal and the second reception signal.

With this configuration, the first reception signal and the second reception signal input from the first common terminal and the second common terminal are selectively input, by the switch element, to the reception-side filter. The reception-side filter filters the frequency band components of the first reception signal and the second reception signal, and outputs, from the reception signal output terminal, the filtered signals to a subsequent circuit (demodulator circuit or other suitable circuit, for example). Accordingly, it is unnecessary to provide a reception filter for each type of communication signal, thereby reducing the circuit dimensions and miniaturizing the RF front-end module.

The reception-side filter according to a preferred embodiment of the present invention may include a first reception-side filter having a pass band that is the frequency band of the first reception signal, and a second reception-side filter having a pass band that is the frequency band of the second reception signal.

Even with this configuration, the circuit dimensions are significantly reduced as compared with a configuration of the related art.

In the RF front-end module according to a preferred embodiment of the present invention, it is preferable that the frequency band of the first reception signal and the frequency band of the second reception signal at least partially overlap.

With this configuration, the pass band of the reception-side filter is simply a range including the frequency band of one of the reception signals and a non-overlapping portion of the frequency band of the other reception signal. Thus, the pass band of the reception-side filter is not a wideband and is easily alienated from the frequency band of each transmission signal, thereby facilitating the design.

The RF front-end module according to a preferred embodiment of the present invention is applicable to the case in which the frequency band of the first reception signal includes the frequency band of the second reception signal, for example.

With this configuration, the pass band of the reception-side filter is only necessary to be set as the frequency band of the first reception signal. Thus, the design of the reception-side filter is further facilitated.

In the RF front-end module according to a preferred embodiment of the present invention, it is preferable that the reception-side filter constitute a duplexer, together with the first transmission-side filter or the second transmission-side filter.

With this configuration, the RF front-end module is further miniaturized since the reception-side filter is integrated with one of the transmission-side filters.

In the RF front-end module according to a preferred embodiment of the present invention, it is preferable that the first transmission-side filter, the second transmission-side filter, and the reception-side filter be SAW filters.

With this configuration, the specific configuration of each filter is indicated. Because it may be difficult to realize SAW filters by using electrode patterns in a multilayer body included in the RF front-end module, the above-described circuit configuration is more effective.

In the RF front-end module according to a preferred embodiment of the present invention, it is preferable that the reception-side filter be a filter with an unbalanced-balanced converting function, and a balanced terminal side be connected to the reception signal output terminal.

With this configuration, the switch element is for unbalanced signals, and miniaturization is possible, compared with a switch element for balanced signals. Accordingly, the RF front-end module is further miniaturized.

According to various preferred embodiments of the present invention, an RF front-end module with significantly reduced circuit dimensions is provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
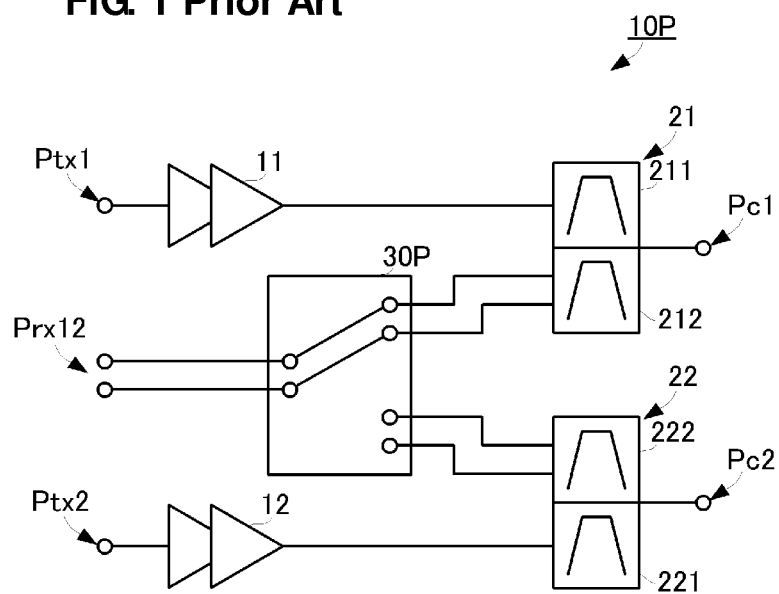
FIG. 1 is a circuit diagram of an RF front-end module of the related art.
Figure 2:
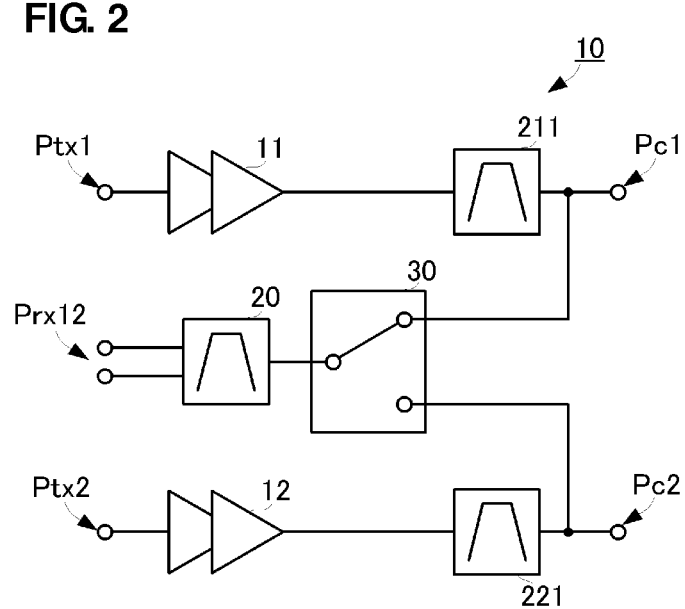
FIG. 2 is a circuit diagram of an RF front-end module according to a first preferred embodiment of the present invention.

An RF front-end module 10 according to a first preferred embodiment of the present invention will be described with reference to the drawings. FIG. 2 is a circuit diagram of the RF front-end module 10 according to the first preferred embodiment.

The RF front-end module 10 preferably includes power amplifiers 11 and 12, transmission-side filters 211 and 221, a reception-side filter 20, and a switch IC 30.

A first transmission signal input terminal Ptx1 is connected to an input end of the power amplifier 11. An output end of the power amplifier 11 is connected to the transmission-side filter 211, which corresponds to a first transmission-side filter.

The transmission-side filter 211 is a filter whose pass band is the frequency band of a transmission signal of a first communication signal, and whose attenuation bands include the frequency bands of a reception signal of the first communication signal, a transmission signal of a second communication signal, and a reception signal of the second communication signal. The transmission-side filter 211 includes, for example, a surface acoustic wave (SAW) filter. Hereinafter, the transmission signal of the first communication signal will be referred to as a first transmission signal, and the reception signal of the first communication signal will be referred to as a first reception signal. Also, the transmission signal of the second communication signal will be referred to as a second transmission signal, and the reception signal of the second communication signal will be referred to as a second reception signal.

A terminal of the transmission-side filter 211 that is opposite to the power amplifier 11 is connected to a first common terminal Pc1.

A second transmission signal input terminal Ptx2 is connected to an input end of the power amplifier 12. An output end of the power amplifier 12 is connected to the transmission-side filter 221, which corresponds to a second transmission-side filter.

The transmission-side filter 221 is a filter whose pass band is the frequency band of the second transmission signal, and whose attenuation bands include the frequency bands of the second reception signal, the first transmission signal, and the first reception signal. The transmission-side filter 221 includes, for example, a SAW filter.

A terminal of the transmission-side filter 221 that is opposite to the power amplifier 12 is connected to a second common terminal Pc2.

The switch IC 30 includes a common port, and first and second individual ports. The common port is selectively connected to the first individual port or the second individual port. That is, in response to a control signal from the outside, the common port is connected to the first individual port or the second individual port.

The first individual port of the switch IC 30 is connected to the first common terminal Pc1. The second individual port of the switch IC 30 is connected to the second common terminal Pc2. The common port of the switch IC 30 is connected to the reception-side filter 20.

The reception-side filter 20 is a filter whose pass band includes the frequency bands of the first reception signal and the second reception signal, and whose attenuation bands include the frequency bands of the first transmission signal and the second transmission signal. The reception-side filter 20 includes, for example, a SAW filter with an unbalanced-balanced converting function.

An unbalanced terminal of the reception-side filter 20 is connected to the switch IC 30. A balanced terminal of the reception-side filter 20 is connected to the balanced-type reception signal output terminal Prx12.

In the RF front-end module 10 with such a configuration, a W-CDMA (Band 1) signal is transmitted and received as the first communication signal, and a W-CDMA (Band 4) signal is transmitted and received as the second communication signal.

Figure 3:
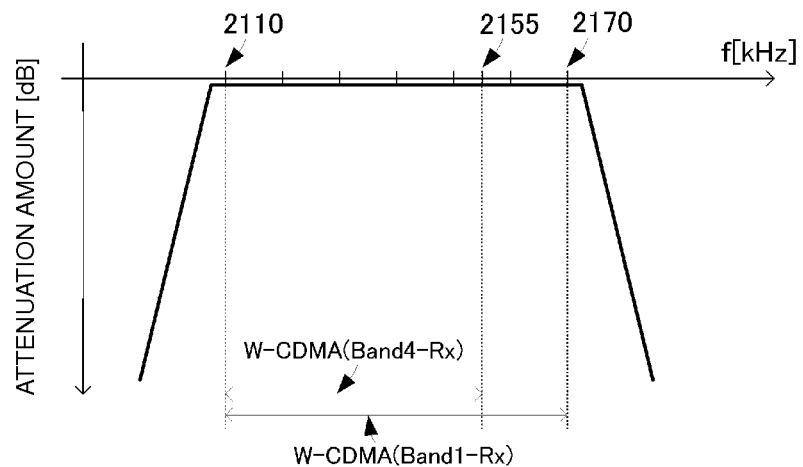
FIG. 3 is a diagram illustrating attenuation characteristics (transmission characteristics) of a reception-side filter.

In this case, the attenuation characteristics of the reception-side filter 20 are set as illustrated in FIG. 3. FIG. 3 is a diagram illustrating the attenuation characteristics (transmission characteristics) of the reception-side filter 20. As illustrated in FIG. 3, the characteristics of the reception-side filter 20 are set so that the pass band includes the frequency band (about 2110 MHz to about 2170 MHz) of the W-CDMA (Band 1) reception signal, which is the first reception signal, and the frequency band (about 2110 MHz to about 2155 MHz) of the W-CDMA (Band 4) reception signal, which is the second reception signal. That is, the settings are made so that, because the frequency band of the W-CDMA (Band 4) reception signal is included in the frequency band of the W-CDMA (Band 1) reception signal, about 2110 MHz to about 2170 MHz, which is the frequency band of the W-CDMA (Band 1) reception signal, serves as the pass band, and frequency bands that are above and below neighboring the pass band on the frequency axis serve as the attenuation bands.

(i) At Transmission of W-CDMA (Band 1) Transmission Signal (First Transmission Signal)

In this case, the switch IC 30 is controlled so that the common port is connected to the second individual port, that is, the common port is not connected to the first individual port.

By causing the first individual port and the common port of the switch IC 30 not to be connected at the transmission of the first transmission signal, the first transmission signal is prevented from leaking to the reception signal output terminal Prx12 via the first individual port and the common port.

The W-CDMA (Band 1) transmission signal is input from the first transmission signal input terminal Ptx1 and amplified by the power amplifier 11. The amplified W-CDMA (Band 1) transmission signal is subjected to harmonics removal at the transmission-side filter 211 and is output from the first common terminal Pc1. The W-CDMA (Band 1) transmission signal output from the first common terminal Pc1 is transmitted from the common antenna via a switch circuit (not illustrated).

(ii) At Reception of W-CDMA (Band 1) Reception Signal (First Reception Signal)

In this case, the switch IC 30 is controlled so that the common port is connected to the first individual port.

The W-CDMA (Band 1) reception signal input from the first common terminal Pc1 is transmitted to the first individual port of the switch IC 30. At this time, the W-CDMA (Band 1) reception signal is also transmitted to the transmission-side filter 211. Since the frequency band of the W-CDMA (Band 1) reception signal is within the attenuation bands of the transmission-side filter 211, the W-CDMA (Band 1) reception signal is not transmitted to the power amplifier 11 side.

The W-CDMA (Band 1) reception signal is transmitted from the first individual port to the common port of the switch IC 30 and is input to the reception-side filter 20. The reception-side filter 20 passes the W-CDMA (Band 1) reception signal, removes harmonics noise components and the like, and outputs the filtered signal to the reception signal output terminal Prx12. At this time, the reception-side filter 20 converts the unbalanced-type W-CDMA (Band 1) reception signal into a balanced type and outputs the balanced-type reception signal.

The balanced-type W-CDMA (Band 1) reception signal is output from the reception signal output terminal Prx12 to a subsequent circuit (demodulator circuit or the like) (not illustrated).

(iii) At Transmission of W-CDMA (Band 4) Transmission Signal (Second Transmission Signal)

In this case, the switch IC 30 is controlled so that the common port is connected to the first individual port, that is, the common port is not connected to the second individual port.

By causing the second individual port and the common port of the switch IC 30 not to be connected at the transmission of the second transmission signal, the second transmission signal is prevented from leaking to the reception signal output terminal Prx12 via the second individual port and the common port.

The W-CDMA (Band 1) transmission signal is input from the second transmission signal input terminal Ptx2 and amplified by the power amplifier 12. The amplified W-CDMA (Band 4) transmission signal is subjected to harmonics removal at the transmission-side filter 221 and is output from the second common terminal Pc2. The W-CDMA (Band 4) transmission signal output from the second common terminal Pc2 is transmitted from the common antenna via the switch circuit (not illustrated).

(iv) At Reception of W-CDMA (Band 4) Reception Signal (Second Reception Signal)

In this case, the switch IC 30 is controlled so that the common port is connected to the second individual port.

The W-CDMA (Band 4) reception signal input from the second common terminal Pc2 is transmitted to the second individual port of the switch IC 30. At this time, the W-CDMA (Band 4) reception signal is also transmitted to the transmission-side filter 221. Since the frequency band of the W-CDMA (Band 4) reception signal is within the attenuation bands of the transmission-side filter 221, the W-CDMA (Band 4) reception signal is not transmitted to the power amplifier 12 side.

The W-CDMA (Band 4) reception signal is transmitted from the second individual port to the common port of the switch IC 30 and is input to the reception-side filter 20. The reception-side filter 20 passes the W-CDMA (Band 4) reception signal, removes harmonics noise components and the like, and outputs the filtered signal to the reception signal output terminal Prx12. At this time, the reception-side filter 20 converts the unbalanced-type W-CDMA (Band 4) reception signal into a balanced type and outputs the balanced-type reception signal.

The balanced-type W-CDMA (Band 4) reception signal is output from the reception signal output terminal Prx12 to the subsequent circuit (demodulator circuit or the like) (not illustrated).

The RF front-end module 10 with such a configuration includes a multilayer body including inner layer electrodes and surface-mounted circuit elements. The above-described transmission-side filters 211 and 221, the reception-side filter 20, and the switch IC 30 are discrete elements that are mounted on the multilayer body or the like, for example. Circuit patterns connecting these discrete elements and the above-described terminals are located on the multilayer body.

Therefore, with the use of the configuration according to the first preferred embodiment, the number of circuit elements is significantly reduced, compared with the related art, and it becomes unnecessary to provide, for each type of communication signal, a duplexer including a transmission-side filter and a reception-side filter that are integrated with each other. Accordingly, the RF front-end module 10 is miniaturized. Even when the RF front-end module 10 is miniaturized, the RF front-end module 10 has communication characteristics equivalent to those of an RF front-end module of the related art.

Because the switch IC 30 preferably is of a single-pole double-throw (SPDT) type, the number of input and output terminals is reduced, compared with a DP4T type of the related art, and the RF front-end module 10 may be further miniaturized.

Figure 4:
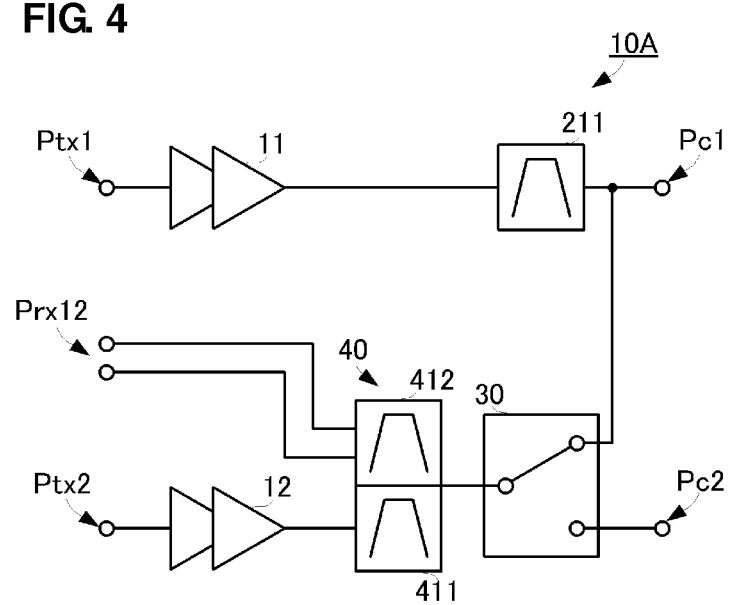
FIG. 4 is a circuit diagram of an RF front-end module according to a second preferred embodiment of the present invention.

Next, an RF front-end module 10A according to a second preferred embodiment of the present invention will be described with reference to the drawings. FIG. 4 is a circuit diagram of the RF front-end module 10A according to the second preferred embodiment.

The RF front-end module 10A includes the power amplifiers 11 and 12, the transmission-side filter 211, the switch IC 30, and a duplexer 40. The duplexer 40 includes a transmission-side filter 411 and a reception-side filter 412 that are integrated with each other.

The transmission-side filter 411 of the duplexer 40 is a filter whose pass band is the frequency band of the second transmission signal, and whose attenuation bands include the frequency bands of the second reception signal, the first transmission signal, and the first reception signal. The transmission-side filter 411 includes, for example, a SAW filter.

The reception-side filter 412 of the duplexer 40 is a filter whose pass band includes the frequency bands of the first reception signal and the second reception signal, and whose attenuation bands include the frequency bands of the first transmission signal and the second transmission signal. The reception-side filter 412 includes, for example, a SAW filter with an unbalanced-balanced converting function.

The first transmission signal input terminal Ptx1 is connected to the input end of the power amplifier 11. The output end of the power amplifier 11 is connected to the transmission-side filter 211, which corresponds to the first transmission-side filter. The transmission-side filter 211 is a filter whose pass band is the frequency band of the first transmission signal, and whose attenuation bands include the frequency bands of the first reception signal, the second transmission signal, and the second reception signal. The transmission-side filter 211 includes, for example, a SAW filter. The terminal of the transmission-side filter 211 that is opposite to the power amplifier 11 is connected to the first common terminal Pc1.

The second transmission signal input terminal Ptx2 is connected to the input end of the power amplifier 12. The output end of the power amplifier 12 is connected to the transmission-side filter 411 of the duplexer 40.

The balanced-type reception signal output terminal Prx12 is connected to the reception-side filter 412 of the duplexer 40.

A common terminal of the duplexer 40 is connected to the common port of the switch IC 30.

The common port of the switch IC 30 is selectively connected to the first individual port or the second individual port, as in the above-described first preferred embodiment. The first individual port of the switch IC 30 is connected to the first common terminal Pc1. The second individual port of the switch IC 30 is connected to the second common terminal Pc2.

In the RF front-end module 10A with such a configuration, as in the first preferred embodiment, the W-CDMA (Band 1) signal is transmitted and received as the first communication signal, and the W-CDMA (Band 4) signal is transmitted and received as the second communication signal. In this case, the attenuation characteristics of the reception-side filter 412 are set is illustrated in FIG. 3, as in the above-described first preferred embodiment.

(i) At Transmission of W-CDMA (Band 1) Transmission Signal (First Transmission Signal)

In this case, the switch IC 30 is controlled so that the common port is connected to the second individual port, that is, the common terminal is not connected to the first individual terminal.

By causing the first individual port and the common port of the switch IC 30 not to be connected at the transmission of the first transmission signal, the first transmission signal is prevented from leaking to the reception signal output terminal Prx12 via the first individual port and the common port.

The W-CDMA (Band 1) transmission signal is input from the first transmission signal input terminal Ptx1 and amplified by the power amplifier 11. The amplified W-CDMA (Band 1) transmission signal is subjected to harmonics removal at the transmission-side filter 211 and is output from the first common terminal Pc1. The W-CDMA (Band 1) transmission signal output from the first common terminal Pc1 is transmitted from the common antenna via the switch circuit (not illustrated).

(ii) At Reception of W-CDMA (Band 1) Reception Signal (First Reception Signal)

In this case, the switch IC 30 is controlled so that the common port is connected to the first individual port.

The W-CDMA (Band 1) reception signal input from the first common terminal Pc1 is transmitted to the first individual port of the switch IC 30. At this time, the W-CDMA (Band 1) reception signal is also transmitted to the transmission-side filter 211. Since the frequency band of the W-CDMA (Band 1) reception signal is within the attenuation bands of the transmission-side filter 211, the W-CDMA (Band 1) reception signal is not transmitted to the power amplifier 11 side.

The W-CDMA (Band 1) reception signal is transmitted from the first individual port to the common port of the switch IC 30 and is input to the common terminal of the duplexer 40.

The reception-side filter 412 of the duplexer 40 passes the W-CDMA (Band 1) reception signal, removes harmonics noise components and the like, and outputs the filtered signal to the reception signal output terminal Prx12. The reception-side filter 412 converts the unbalanced-type W-CDMA (Band 1) reception signal into a balanced type and outputs the balanced-type reception signal. At this time, the balanced-type W-CDMA (Band 1) reception signal is also input to the transmission-side filter 411 included in the duplexer 40. Since the frequency band of the W-CDMA (Band 1) reception signal is within the attenuation bands of the transmission-side filter 411, the W-CDMA (Band 1) reception signal is not transmitted to the power amplifier 12 side.

The balanced-type W-CDMA (Band 1) reception signal is output from the reception signal output terminal Prx12 to the subsequent circuit (demodulator circuit or the like) (not illustrated).

(iii) At Transmission of W-CDMA (Band 4) Transmission Signal (Second Transmission Signal)

In this case, the switch IC 30 is controlled so that the common port is connected to the second individual port.

The W-CDMA (Band 4) transmission signal is input from the second transmission signal input terminal Ptx2 and amplified by the power amplifier 12. The amplified W-CDMA (Band 4) transmission signal is subjected to harmonics removal at the transmission-side filter 411 of the duplexer 40 and is input to the common port of the switch IC 30. The W-CDMA (Band 4) transmission signal is transmitted from the common port to the second individual port of the switch IC 30 and is output from the second common terminal Pc2. The W-CDMA (Band 4) transmission signal output from the second common terminal Pc2 is transmitted from the common antenna via the switch circuit (not illustrated).

(iv) At Reception of W-CDMA (Band 4) Reception Signal (Second Reception Signal)

In this case, the switch IC 30 is controlled so that the common port is connected to the second individual port.

The W-CDMA (Band 4) reception signal input from the second common terminal Pc2 is transmitted to the second individual port of the switch IC 30.

The W-CDMA (Band 4) reception signal is transmitted from the second individual port to the common port of the switch IC 30 and is input to the common terminal of the duplexer 40.

The reception-side filter 412 of the duplexer 40 passes the W-CDMA (Band 4) reception signal, removes harmonics noise components and the like, and outputs the filtered signal to the reception signal output terminal Prx12. The reception-side filter 412 converts the unbalanced-type W-CDMA (Band 4) reception signal into a balanced type and outputs the balanced-type reception signal. At this time, the balanced-type W-CDMA (Band 4) reception signal is also input to the transmission-side filter 411 included in the duplexer 40. Since the frequency band of the W-CDMA (Band 4) reception signal is within the attenuation bands of the transmission-side filter 411, the W-CDMA (Band 4) reception signal is not transmitted to the power amplifier 12 side.

The balanced W-CDMA (Band 4) reception signal is output from the reception signal output terminal Prx12 to the subsequent circuit (demodulator circuit or the like) (not illustrated).

Even with such a configuration, the RF front-end module 10A may be miniaturized, as in the above-described first preferred embodiment. Further, in the configuration according to the second preferred embodiment, one of the two transmission-side filters 211 and 411, namely, the transmission-side filter 411, is integrated with the reception-side filter 412, thereby constituting the duplexer 40. Thus, further miniaturization is possible.

Figure 5:
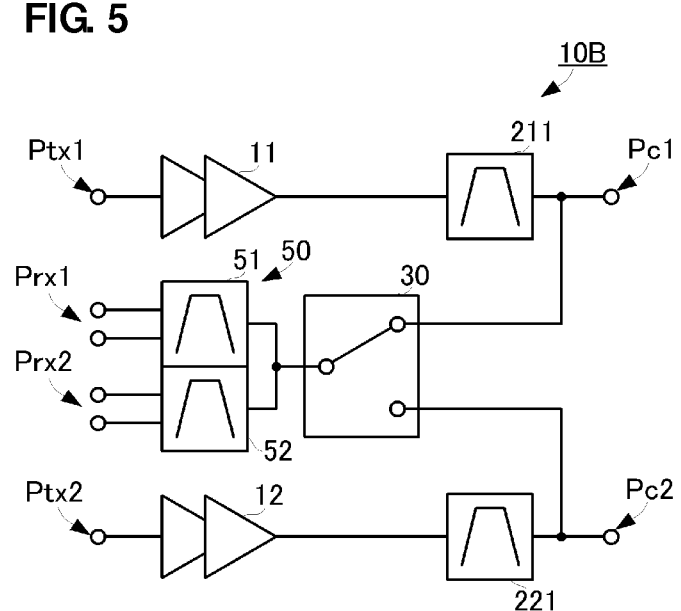
FIG. 5 is a circuit diagram of an RF front-end module with another configuration according to a preferred embodiment of the present invention.

The above-described first preferred embodiment discusses the configuration in which the single reception-side filter 20, which has the pass band including both of the frequency bands of the two types of reception signals, is connected to the common port of the switch IC 30. However, a configuration such as that illustrated in FIG. 5 may be adopted. FIG. 5 is a circuit diagram of an RF front-end module 10B with another configuration. The RF front-end module 10B preferably is the same as the RF front-end module 10 discussed in the first preferred embodiment except for a circuit configuration connected to the common port of the switch IC 30. Thus, only the different portion will be described.

A dual-type reception-side filter 50 including reception-side filters 51 and 52 that are integrated in a single housing is connected to the common port of the switch IC 30. The reception-side filter 51 is a filter whose pass band is the frequency band of the first reception signal. The reception-side filter 51 is realized by, for example, a SAW filter with an unbalanced-balanced converting function. The reception-side filter 52 is a filter whose pass band is the frequency band of the second reception signal. The reception-side filter 52 is realized by, for example, a SAW filter with an unbalanced-balanced converting function.

Unbalanced terminals of the reception-side filters 51 and 52 are connected to the common port of the switch IC 30. A balanced terminal of the reception-side filter 51 is connected to a reception signal output terminal Prx1. A balanced terminal of the reception-side filter 52 is connected to a reception signal output terminal Prx2.

The reception signal output terminals Prx1 and Prx2 are connected to the subsequent circuit (demodulator circuit or the like) (not illustrated). Even with such a configuration, the circuit may be simplified, compared with a configuration of the related art, and miniaturization is possible. In the configuration illustrated in FIG. 5, when the W-CDMA (Band 1) communication signal serves as the first communication signal and the W-CDMA (Band 4) communication signal serves as the second communication signal, the pass bands of the reception-side filters 51 and 52 partially overlap. The first reception signal is partially output from the reception signal output terminal Prx2, and the second reception signal is partially output from the reception signal output terminal Prx1. In this case, the subsequent circuit may select one of signals output from the reception signal output terminals Prx1 and Prx2.

In the above description, the first communication signal preferably is the W-CDMA (Band 1) communication signal, and the second communication signal preferably is the W-CDMA (Band 4) communication signal. However, the above-described configuration is applicable to the case where the second communication signal is the W-CDMA (Band 1) communication signal and the first communication signal is the W-CDMA (Band 4) communication signal, and similar advantages may be achieved.

In the above description, the case in which the W-CDMA (Band 1) communication signal and the W-CDMA (Band 4) communication signal are transmitted and received, that is, the case in which one of the reception signal frequency bands includes the other reception signal frequency band, has been discussed. However, the above-described configuration is applicable to the case in which two or more types of communication signals whose reception signal frequency bands partially overlap are transmitted and received, and similar advantages may be achieved. Further, the above-described configuration is applicable even to the case in which the frequencies of two types of reception signals are very close to each other, that is, more specifically, the case in which the upper limit frequency of the first reception signal is substantially the same as the lower limit frequency of the second reception signal, and similar advantages may be achieved.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A radio-frequency front-end module that transmits and receives a first communication signal and a second communication signal, the first communication signal including a first transmission signal and a first reception signal, and the second communication signal including a second transmission signal and a second reception signal, the radio-frequency front-end module comprising:

a first transmission signal input terminal to which the first transmission signal is input;

a first common terminal that outputs the first transmission signal and inputs the first reception signal;

a second transmission signal input terminal to which the second transmission signal is input;

a second common terminal that outputs the second transmission signal and inputs the second reception signal;

a reception signal output terminal that outputs the first reception signal and the second reception signal;

a first transmission-side filter connected between the first transmission signal input terminal and the first common terminal, the first transmission-side filter having a pass band that is a frequency band of the first transmission signal and an attenuation band including a frequency band of the first reception signal;

a second transmission-side filter connected between the second transmission signal input terminal and the second common terminal, the second transmission-side filter having a pass band that is a frequency band of the second transmission signal and an attenuation band including a frequency band of the second reception signal;

a switch element including a plurality of individual ports to which the first common terminal and the second common terminal are respectively directly connected, and a common port to which the plurality of individual ports are individually switched and connected; and a reception-side filter connected between the common port and the reception signal output terminal, the reception-side filter having a pass band including the frequency bands of the first reception signal and the second reception signal.

2. The radio-frequency front-end module according to claim 1, wherein the reception-side filter includes a first reception-side filter having a pass band that is the frequency band of the first reception signal, and a second reception-side filter having a pass band that is the frequency band of the second reception signal.

3. The radio-frequency front-end module according to claim 1, wherein the frequency band of the first reception signal and the frequency band of the second reception signal at least partially overlap.

4. The radio-frequency front-end module according to claim 3, wherein the frequency band of the first reception signal includes the frequency band of the second reception signal.

5. The radio-frequency front-end module according to claim 1, wherein the reception-side filter constitutes a duplexer, together with the first transmission-side filter or the second transmission-side filter.

6. The radio-frequency front-end module according to claim 1, wherein the first transmission-side filter, the second transmission-side filter, and the reception-side filter are surface acoustic wave filters.

7. The radio-frequency front-end module according to claim 1, wherein the reception-side filter is a filter with an unbalanced-balanced converting function, and a balanced terminal side is connected to the reception signal output terminal.

* * * * *